Patented Jan. 10, 1950

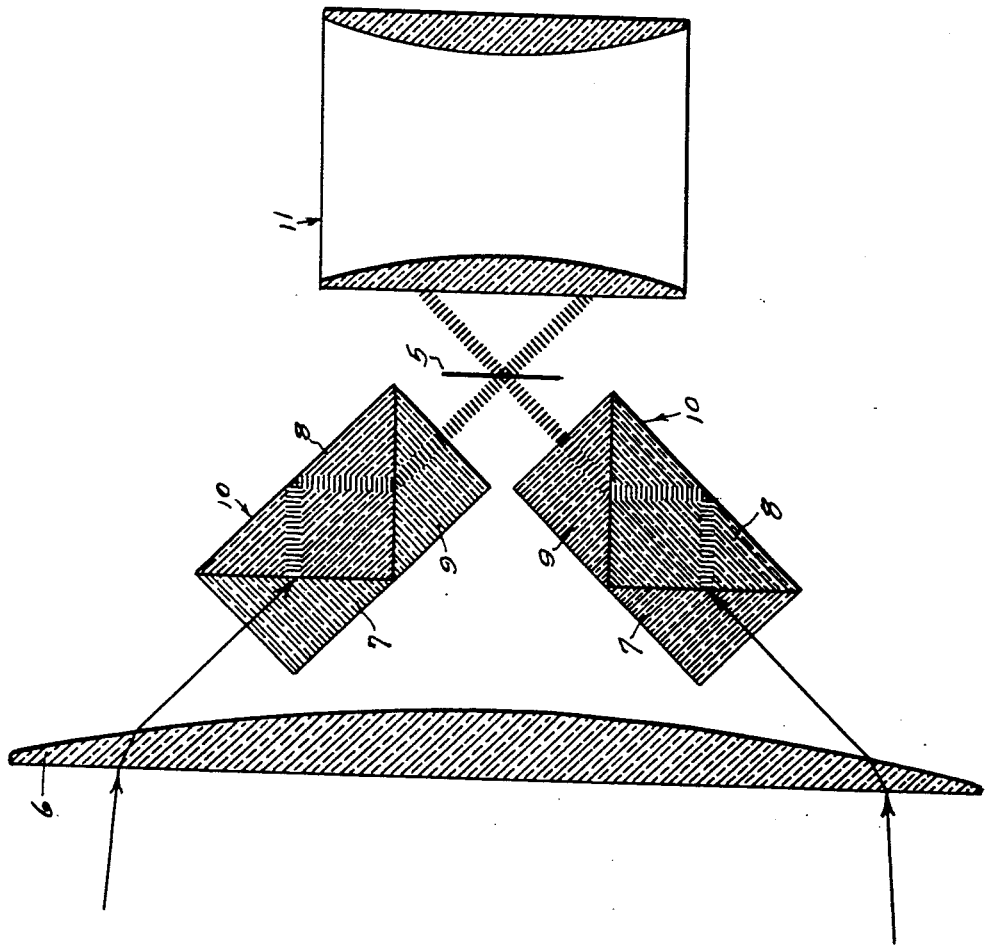

2,494,356

UNITED STATES PATENT OFFICE 2,494,356

APPARATUS FOR ILLUMINATING IMAGES FOR PROJECTORS

Browning G. Robbins, Walla Walla, Wash., assignor to Glorioscope, Inc., Seattle, Wash., a corporation of Washington Application July 21, 1947, Serial No. 762,403

3 Claims. (Cl. 88—24)

This invention relates to apparatus for illuminating images, and is applicable to the photographing of images as well as to the projections of images from motion picture film onto a screen.

Generally stated, the invention has for its object the provision of an improved apparatus for projecting images which, when viewed on the screen, give the desirable perspective of depth, or which is to say appearance of solidity, and in the provision of improved means by which the same is performed.

The invention consists in such improved means as will be hereinafter described and claimed.

In the drawing:

The single figure is a diagrammatic view illustrating optical elements which in combination achieve the objectives of my invention, the path of rays being represented at right angles to the optical axis.

Having reference to said drawing, and first considering the invention from the standpoint of projecting an image from film onto the screen, let it be assumed that the parts shown are the components of a projection machine, and that the numeral 5 denotes the film contained therein, while 6 represents a converging lens in focus on the film. Between the converging lens and the film there are introduced two prism assemblies each comprised of three prisms 7—8—9 cemented together and so placed in line with the converging rays of light as to have the parallel beams of spectra cross at right angles on the film at the focal point of the converging lens. These prisms, as well as the lens, are necessarily precision ground, and it is essential that all light be blocked out other than the light entering the converging lens and issuing therefrom to pass through and emerge as spectra from the combination of prisms. In producing the composite body comprised of three prisms, the center prism 8 is suitably treated, as by the application of nitrate of silver, to present a mirrored reflecting face 10, this treatment being done after assembling and cementing the prisms together, and a coating of black paint is then applied to all of the side faces, and which is to say all of the faces other than those surfaces through which the light enters and leaves. Spaced forwardly beyond the film is the usual projection lens denoted 11.

Reverting to the converging lens, it is quite important to the accomplishment of the present objective that the aperture of this lens be wider than the distance between the eyes of a person viewing the projected image, and it is found that an aperture of at least four inches will best suffice for the purpose. Two ends are attained in consequence of this employment of a converging lens having a width greater than the distance between the eyes of the individual viewing the projected image, one being to obtain greater illumination but the more important accomplishment is to obtain an apparent effect of the projected image standing out forwardly from the screen. The use of a converging lens the aperture of which is less than the distance between the eyes would still accomplish the effect of depth, but the image in this instance would seem to lie behind rather than forward of the plane of the picture screen. The two eyes do not register at the same angle, nor do they register with the same perspective to depth.

While the foregoing description concerns itself with the projection of images which are or may have been photographed in accordance with the procedure now commonly practiced in the motion picture industry, and although the illusion of three dimensions, and namely solidity, which I accomplish with this regulation film is very effective, a strikingly more beautiful projection is attained if, in addition to its employment in the projection of the image, the condition of light obtained from an association of converging lens and prisms as hereinbefore described is also provided when photographing the image upon negative film and later in passing these photographed images onto a printed negative. For such photographing, the arrangement of parts is substantially the same as above set forth, and namely with the two prism combinations 9—10—11 adjusted between the camera lens and the negative film such as to have the beams of parallel spectra cross at the exact focal point of the camera lens on the film.

At the point of their crossing, these two beams of parallel spectra are neutralized and appear to be white light, but they retain all the color shades of the spectrum, and as the images being photographed pass through the neutralized spectra they carry with the spectra the original color of the object as it is seen by the lens of the camera. Each shade of color from the image of the photographed object is caused to burn its individual design into the sensitive emulsion on the negative film, with the tiny color patterns each absorbing only the same shades of color as that of the object photographed. Coming from different angles, one as projected through one combination and the other through the other combination of prisms, there are burned into the negative film two distinct images of the same object, and it should be here again stressed that the apparent source of light, in this instance the camera lens, is wider than the distance between the eyes.

When printing from this exposed negative, the same combination of prisms, and the same aperture converging lens as the lens of the camera, must be here again used in order that the same condition of light will be established in passing the colored images onto the printed negative. The tiny color patterns on the exposed negative absorb their shade of color at the same angle and pass through to the printed negative, burning their image of the photographed object into the emulsion on the print at identically this same angle.

After now developing the printed negative, the projection of the film onto the screen is performed in the manner first above described, creating for such projection the identical condition of light by using the same apparent source (the condensing lens) and the same combination of prisms in a relationship duplicating that which peculiarized the photographing and the developing.

Now, as the image is projected, the tiny color patterns which were burned from the original negative onto the printed negative absorb their individual shades of color at the same angle. The two parallel beams of spectra each with the image of the object photographed, diverge as they leave the film and, passing through the projection lens 11, are brought by the latter into focus on the screen. Having an image for each eye of the observer to view, one image is apparently back of the other due to an inability of the two eyes to register at the same angle, or with the same perspective as to depth, and the illusion of solidity is unusually pronounced with the picture being exceptionally realistic and strikingly beautiful.

In practicing the invention, it should, perhaps, be pointed out that the emulsion side of the film must always face the source of light. The prism combinations may obviously be designed for any aperture light source of any focal length.

It should be understood that while only the center rays are illustrated in their respective paths, all rays traversing both prism assemblies receive the same treatment, and perforce are each individually refracted on differing angles of refraction to ultimately reach the plane of the film on a common focal point.

The invention, and the manner of its usage, is believed clear from the foregoing description. It will have been apparent from said description that the invention lends itself to projection of motion pictures even when applied to film the images on which have been obtained with conventional photographing equipment. The appearance of solidity is in such instance quite marked, but is not, however, to be compared with the beauty and reality obtained when the condition of light created by the employment of my combinations of prisms and light source are made to obtain throughout each of the procedural steps of photographing the object, printing, and projecting. It is my intention that the hereto annexed claims be given a scope commensurate with the broadest interpretation which the language fairly permits.

What I claim, is:

1. An optical system of illuminating photographic images comprising a condensing lens having a greater width than the distance between the eyes of an observer and serving as an apparent source of light directing emerging light rays along converging paths, and associated with two sets of optical means introduced one in one and the other in the other of said converging paths at opposite sides of the optical axis and causing the rays passing therethrough to be dispersed into plane spectra differing in the order of dispersion as between the rays dispersed by one and the rays dispersed by the other of said composite prisms and with the placement of the prisms such that the emerging spectra cross approximately at right angles to one another in the plane of the photographic image.

2. An optical system of illuminating photographic images comprising a condensing lens having a greater width than the distance between the eyes of an observer and serving as an apparent source of light directing emerging light rays along converging paths, and associated with two composite prisms introduced one in one and the other in the other of said converging paths at opposite sides of the optical axis and causing the rays passing therethrough to be dispersed into plane spectra differing in the order of dispersion as between the rays dispersed by one and the rays dispersed by the other of said composite prisms and with the form and placement of the prisms such that the emerging spectra cross approximately at right angles to one another at the focal point of the condenser lens, said focal point coinciding with the plane of the photographic image.

3. The system of claim 2 in which said composite prisms are each comprised of three triangular bodies cementitiously bonded together in a unitary block of substantially rectangular configuration and having the center prism coated to provide a mirror surface upon the exposed face which lies in the path of spectra refracted from the oblique face of the first prism.

BROWNING G. ROBBINS.

REFERENCES CITED

The following references are of record in the file of this patent:

UNITED STATES PATENTS

| Number | Name | Date |
| --- | --- | --- |
| 862,354 | Stevens | Aug. 6, 1907 |
| 905,802 | Drac | Dec. 1, 1908 |
| 1,006,230 | Kollmorgen | Oct. 17, 1911 |
| 1,462,348 | Lyons | July 17, 1923 |
| 1,732,848 | Lapensee | Oct. 22, 1929 |
| 1,876,806 | Waide | Sept. 13, 1932 |
| 2,206,521 | Akker et al. | July 2, 1940 |
| 2,326,951 | Kober et al. | Aug. 17, 1943 |

FOREIGN PATENTS

| Number | Country | Date |
| --- | --- | --- |
| 22,934 | Great Britain | of 1912 |
| 225,754 | Germany | Sept. 19, 1910 |